(12) United States Patent
Röllig et al.

(10) Patent No.: US 8,458,367 B2
(45) Date of Patent: Jun. 4, 2013

(54) METHOD AND DEVICE FOR HANDLING SMBUS MESSAGES

(75) Inventors: René Röllig, Frankenberg (DE); Andreas Abt, Dresden (DE); Frank Schücke, Dresden (DE); Bernd Schönfelder, Weinböhla (DE); Daniel Schöne, Dresden (DE); Gert Springer, Dresden (DD)

(73) Assignee: Advanced Micro Devices, Sunnyvale, CA (US)

( * ) Notice: Subject to any disclaimer, the term of this patent is extended or adjusted under 35 U.S.C. 154(b) by 2139 days.

(21) Appl. No.: 10/679,623

(22) Filed: Oct. 6, 2003

(65) Prior Publication Data
US 2005/0080950 A1 Apr. 14, 2005

(30) Foreign Application Priority Data
Oct. 25, 2002 (DE) .................................. 102 49 883

(51) Int. Cl.
*G06F 3/00* (2006.01)
(52) U.S. Cl.
USPC ............... 710/3; 710/1; 710/5; 710/7; 710/8; 710/9; 710/10; 710/15; 710/62
(58) Field of Classification Search
USPC .................. 710/1, 3, 5, 7, 8, 9, 10, 15, 62
See application file for complete search history.

(56) References Cited

U.S. PATENT DOCUMENTS

| 5,581,719 | A | * | 12/1996 | Steely et al. ................ 712/207 |
| 5,636,342 | A |   | 6/1997  | Jeffries |
| 6,505,267 | B2 | * | 1/2003 | Luke et al. .................. 710/315 |
| 2003/0163599 | A1 | * | 8/2003 | Hills et al. ................. 709/318 |
| 2003/0198185 | A1 |   | 10/2003 | Stancil |

OTHER PUBLICATIONS

Newton's Telecom Dictionary 21$^{st}$ edition by Hary Newton (3 pages).*

* cited by examiner

*Primary Examiner* — Idriss N Alrobaye
*Assistant Examiner* — Jasjit Vidwan
(74) *Attorney, Agent, or Firm* — Meyertons Hood Kivlin Kowert & Goetzel

(57) ABSTRACT

An SMBus message handler, an integrated circuit and a method for controlling an SMBus are disclosed which identifies starting address of a program being stored in a memory. Instructions of the program are fetched one after another into a finite-state machine which controls the data transfer between an SMBus interface and a register set in compliance with the instruction present in the finite-state machine. Further, an SMBus test device and a method for controlling a testing system are described which check as to whether a key is input from a second interface. Upon inputting of a key it is mapped to a sequence of instructions for controlling devices connected to the SMBus or transferring data or receiving data from the devices connected to the SMBus.

29 Claims, 19 Drawing Sheets

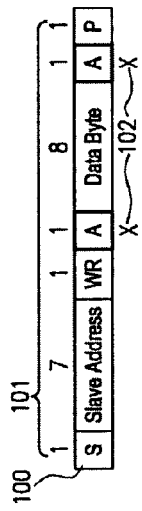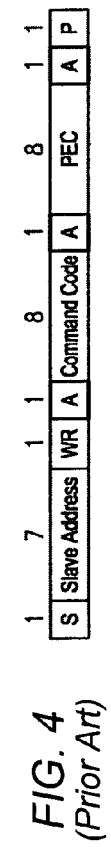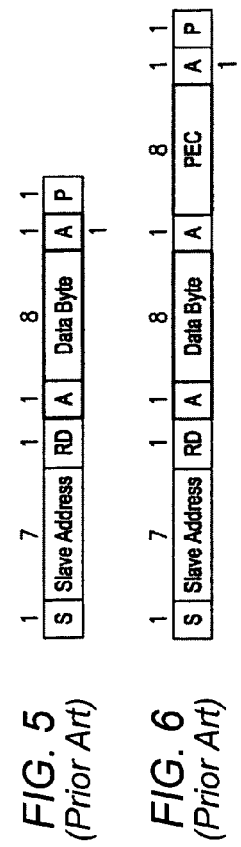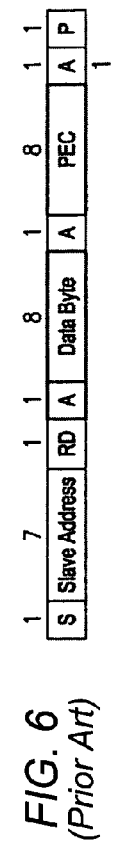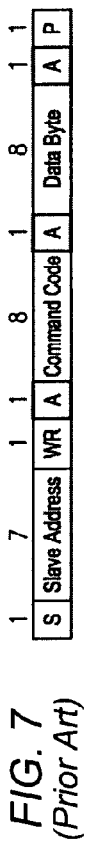
FIG. 1 (Prior Art)
FIG. 2 (Prior Art)
FIG. 3 (Prior Art)
FIG. 4 (Prior Art)
FIG. 5 (Prior Art)
FIG. 6 (Prior Art)
FIG. 7 (Prior Art)
FIG. 8 (Prior Art)

| S | Slave Address | WR | A | Command Code | A | Data Byte High | A | Data Byte Low | A | PEC | A | P |
|---|---|---|---|---|---|---|---|---|---|---|---|---|

FIG. 15
(Prior Art)

| S | Slave Address | WR | A | Command Code | A | SR | Slave Address | RD | A | Data Byte Low | A | Data Byte High | A | P |
|---|---|---|---|---|---|---|---|---|---|---|---|---|---|---|

FIG. 16
(Prior Art)

| S | Slave Address | WR | A | Command Code | A | SR | Slave Address | RD | A | Data Byte Low | A | Data Byte High | A | PEC | A | P |
|---|---|---|---|---|---|---|---|---|---|---|---|---|---|---|---|---|

FIG. 17
(Prior Art)

| S | Slave Address | WR | A | Command Code | A | Byte Count=N | A | Data Byte 1 | A | Data Byte 2 | A | ... | Data Byte N | A | P |
|---|---|---|---|---|---|---|---|---|---|---|---|---|---|---|---|

METHOD AND DEVICE FOR HANDLING SMBUS MESSAGES

FIELD OF THE PRESENT INVENTION

The present invention relates to the field of fabrication of integrated circuits and in particular to integrated circuits and methods implementing SMBus control. According to one aspect of the present invention it specifically relates to an SMBus message handler for managing the data transfer between an SMBus and a register set. According to another aspect of this invention it relates to a method for controlling an SMBus. According to yet another aspect of this invention, it relates to an integrated circuit chip for transmitting and receiving data over an SMBus. According to a further aspect of this invention, it relates to an SMBus test device and a method for controlling a testing system for SMBus chip set validation.

DESCRIPTION OF THE PRIOR ART

For data exchange between more than two devices various bus systems have been developed. All devices are usually connected to the bus lines. Therefore, only one device at a time may transmit data to one or more other devices connected to the bus and appropriate measures must be taken to make sure that only one device outputs data onto the bus. One measure is the use of tri-state outputs at each device. Another measure is to use open-drain or open-collector output stages and to pull up the bus lines by a voltage. So the outputs of the bus devices, the bus lines and the pull-up resistors form a wired AND function.

A system management bus (SMBus) specification is generally known.

SMBus is a two-wire bus. Multiple devices, both bus masters and bus slaves may be connected to an SMBus. Generally, a bus master device initiates a bus transfer between it and a single bus slave and provides the clock signals. A bus slave device can receive data provided by the master or it can provide data to the master.

The two lines of the SMBus are designated SMBCLK and SMBDAT. Both lines are bi-directional and connected to a positive supply voltage through a pull-up resistor, a current source or another similar circuit. When the bus is free, both lines are high. A master device provides the clock at line SMBCLK. The SMBDAT line is driven either by the master or by the slave depending on the transmission state. Moreover, in compliance with Annex A of the SMBus specification 2.0, two optional lines SMBSUS# and SMBALERT# may be provided.

Only one device may master the bus at any time. Since more than one device may attempt to take control of the bus as a master, SMBus provides an arbitration mechanism that relies on the wired AND connection of the SMBus device interfaces to the SMBus.

Two unique bus situations define a message START and STOP condition. A high-to-low transition of the SMBDAT line while the SMBCLK line is high indicates a message START condition. A low-to-high transition of the SMBDAT line while the SMBCLK line is high defines a message STOP condition. START and STOP conditions are always generated by the bus master. After a START condition the bus is considered to be busy. The bus becomes idle again after a certain time following a stop condition or after both the SMBCLK and SMBDAT lines remain high for more than Thigh:Max (50 μseconds).

Data are transferred bytewise, wherein every byte consists of eight bits. Each byte transferred on the bus must be followed by an acknowledge bit. Bytes are transferred with the most significant bit first. As any other clock pulse, the acknowledge-related clock pulse is generated by the master. The transmitter master or slave, releases the SMBDAT line during the acknowledge clock cycle. In order to acknowledge a byte, the receiver must pull the SMBDAT line low during the high period of the clock pulse. A receiver that wishes not to acknowledge (NACK) a byte must let the SMBDAT line remain high during the acknowledge dock pulse. An SMBus device must always acknowledge (ACK) its own address. An SMBus slave device may decide to NACK a byte other than the address byte, if the slave device is busy performing a real-time task, if data requested are not available, if the slave device detects invalid command or invalid data.

The master upon detection of the NACK condition must generate a STOP condition to abort the transfer. Further, if a master-receiver is involved in the transaction, it must signal the end of data to the slave transmitter by generating a NACK on the last byte that was clocked out by the slave. The slave transmitter must release the data line to allow the master to generate a STOP condition.

A situation may occur in which more than one master is trying to place clock signals on the bus at the same time. The resulting bus signal will be the wired AND of all the clock signals provided by the masters. A high-to-low transition on the SMBCLK line will cause all devices involved to start counting of their LOW period and start driving SMBCLK low if the device is a master. As soon as a device finishes counting its LOW period it will release SMBCLK line. Nevertheless, the actual signal on the SMBCLK line may transition to the high state of another master with longer LOW period keeping the SMBCLK line low. In this situation, the master that released SMBCLK line will enter the SMBCLK HIGH wait period. When all devices have counted off their LOW period, the SMBCLK will be released and go HIGH. All devices concerned at this point will start counting their HIGH periods. The first device that completes its high period count will pull the SMBCLK line low and the cycle will start again. So, for synchronization purposes, the LOW period is determined by the slowest device and the HIGH period is determined by the fastest device.

One or more devices may generate a START condition within the minimum hold time resulting in a defined START condition on the bus. Since the devices that generated the START condition may not be aware that other masters are contending for the bus, arbitration takes place on the SMBDAT line while the SMBCLK is high. A master that transmits a HIGH level, while the other(s) master(s) is/are transmitting a LOW level on the SMBDAT line loses control of the bus in the arbitration cycle. The arbitration may comprise the slave device address, the transfer data, a repeated start, and the following data bits.

Besides slave devices which receive or respond to commands, master devices which issue commands, generate the clocks and terminate the transfer, the SMBus specification defines a host device. A host device is a specialized master that provides the main interface to a systems CPU. A host must support the SMBus host notify protocol. There may be at most one host in a system.

Any device that exists on the system management bus as a slave has a unique address called the slave address. A slave address comprises seven bits which are completed by a read or write (R/W) bit to a byte. The R/W bit is the least significant bit of the byte.

Version 1.1 of the SMBus specification introduced a packet error checking mechanism to improve reliability and communication with busses. Packet error checking is implemented by appending a packet error code (PEC) at the end of each message transfer. Each protocol except for a quick command and a host notifier protocol has two variants: one with the PEC byte and one without. The PEC may be calculated in any way that conforms to 8-bit cycle redundancy check (CRC-8) represented by the polynomial, $C(x)=x^8+x^2+x^1+1$. The PEC calculation includes all bytes in the transmission including address, command and data. The PEC calculation does not include ACK, NACK, START, STOP nor Repeated START bits.

FIG. 1 shows a generic SMBus packet protocol diagram. S designates a start condition, Sr a repeated start condition, Rd an R/W bit having a value of 1, Wr a R/W bit value of 0. An "x" shown under a field indicates that the field is required to have the value of "x". "A" designates an acknowledge bit position which may have a value of 0 for acknowledgment (ACK) or 1 for non-acknowledgment (NACK). "P" designates a stop condition and PEC a packet error code. White parts designate a communication from a master to slave, gray parts a slave-to-master communication. Three dots designate a continuation of protocol.

FIG. 2 shows a quick command protocol. Here the R/W bit denotes the command which may be used to simply turn a device function on or off.

FIGS. 3 and 4 show a sent byte protocol wherein the protocol of FIG. 4 comprises a PEC byte. The data byte transferred to the slave device may designate up to 256 possible encoded commands.

FIG. 5 shows a receive byte protocol. FIG. 6 shows a receive byte protocol with PEC. The receive byte protocol is similar to a send byte protocol. The only difference is the direction of data transferred. A NACK (a "1" in the ACK bit position) signifies the end of a transfer.

FIG. 7 shows a write byte protocol, FIG. 8 a write word protocol, FIG. 9 a write byte protocol with PEC and FIG. 10 a write word protocol with PEC. The first byte of a write byte/word protocol is the command code. The next one or two bytes, respectively, are the data to be written. In this example, the master inserts the slave devise address followed by the write bit. The slave device acknowledges and the master delivers the command code. This slave again acknowledges before the master sends the data byte or word. The slave acknowledges each byte and the entire transaction is finished with a STOP condition.

Figures 9, 10, 11, 12, 13:
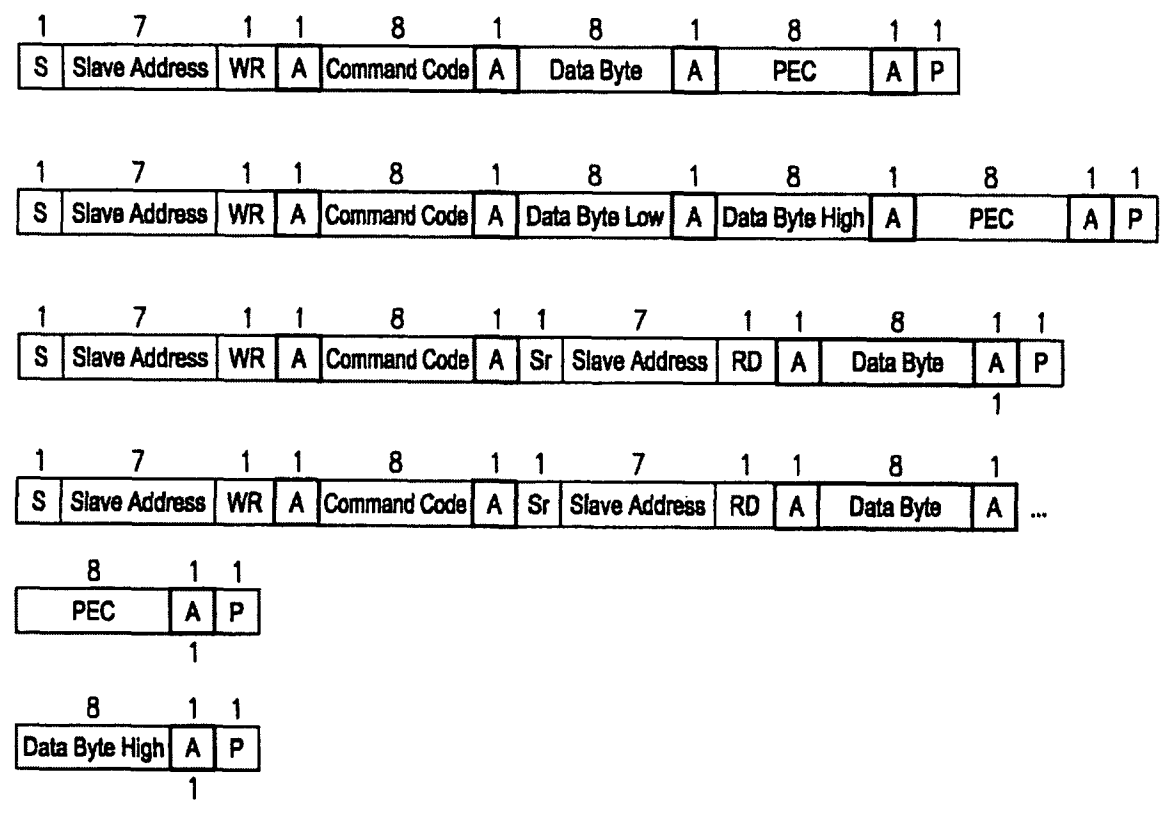

FIGS. 11, 12, 13 and 14 show a read byte protocol, a read byte protocol with PEC, a read word protocol and a read word protocol with PEC, respectively. When reading data, the master must write a command to the slave device. Then it must follow that command with a repeated start condition to denote a read from that device's address. The slave then returns one or two bytes of data. There is no STOP condition before the Repeated START condition. A NACK signifies the end of the read transfer protocols.

FIG. 15 illustrates a process call protocol. FIG. 16 presents a process call protocol with PEC. The process call protocol is so named because a command sends data and waits for the slave to return a value dependent on that data. The protocol is simply a write word followed by read word without the read word command field and the write-word STOP bit.

FIG. 17 shows a block write protocol. FIG. 18 illustrates a block write protocol with PEC. The block write protocol begins with a slave address and a write condition. After the command code, the master issues a byte count which describes how many more bytes will follow the message. If a master has 20 bytes to send, the byte count field will have a value of 20 (14h), followed by the 20 bytes of data. The byte count does not include the PEC byte and may not be zero. A block write protocol is allowed to transfer a maximum of 32 data bytes.

FIG. 19 shows a block read protocol and FIG. 20 a block read protocol with PEC. A block read differs from a block write in that the repeated START condition exists to satisfy the requirement of a change in the transfer direction. A NACK immediately preceding the STOP condition signifies the end of the read transfer. Also, a block read protocol is allowed to transfer a maximum of 32 data bytes.

FIG. 21 shows a block write-block read process call protocol whereas FIG. 22 shows such a protocol including a PEC. The block write-block read process call is a two-part message. It begins with the slave address and a write condition. After the command code, the host issues a write byte count that describes how many more bytes will be written in the first part of the message. The second part of the message is a block of read data beginning with a repeated START condition followed by the slave address and a read bit. The next byte is the read byte count which may differ from the write byte count. Both the write byte count and the read byte count cannot be zero. The sum of the write byte count and the read byte count must not exceed 32 bytes. The read byte count does not include the PEC byte.

A standard interface for controlling an SMBus is defined in Advanced Configuration and Power Interface (ACPI), Specification 2.0. Via that interface described in Section 13.9 of the ACPI Specification, an ACPI-compatible operating system can communicate with embedded controller-based SMBus host controllers (EC-SMB-HG). The interface consists of a block of registers that reside in embedded controller address space. These registers are used by software to initiate SMBus transactions and receive SMBus notifications. FIG. 23, reference numeral 208, designates an ACPI-compliant register set.

The protocol register designated SMB_PRTCL determines the type of SMBus transaction generated on the SMBus. A write to this register initiates a transaction on the SMBus. If the most significant bit (MSB) of this register is set to one (1), a PEC format should be used for the specified protocol, and a value of zero indicates the standard format without PEC should be used. The following table 1 maps the protocol values to the protocol. An "h" following a number indicates that the number is a hexadecimal number throughout this specification.

TABLE 1

| | |
|---|---|
| 00h | CONTROLLER NOT IN USE |
| 01h | RESERVED |
| 02h | WRITE QUICK COMMAND |
| 03h | READ QUICK COMMAND |
| 04h | SEND BYTE |
| 05h | RECEIVE BYTE |
| 06h | WRITE BYTE |
| 07h | READ BYTE |
| 08h | WRITE WORD |
| 09h | READ WORD |
| 0Ah | WRITE BLOCK |
| 0Bh | READ BLOCK |
| 0Ch | PROCESS CALL |
| 0Dh | BLOCK WRITE-BLOCK READ PROCESS CALL |

The status register designated SMB_STS indicates general status on the SMBus. This register is cleared to zero, except for the alarm bit whenever a new command is issued using a write to the protocol register. This register is always written with the error code before clearing the protocol register.

The address register designated SMB_ADDR contains the 7-bit address to be generated on the SMBus in the seven most significant bits (MSB). The least significant bit (LSB) is reserved. The command register designated SMB_CMD contains the command byte that will be sent to the target devise on the SMBus. The register set further comprises 32 data registers designated SMB_DATA[i], i=0-31. The data registers contain the remaining bytes to be sent or received in any of the different protocols that can be run on the SMBus. The block count register designated SMB_BCNT contains the number of bytes of data present in the data registers SMB_DATA[i]. Moreover, the ACPI-compliant register set comprises three alarm registers designated SMB_ALRM_ADDR, SMB_ALRM_DATA[0] and SMB_ALRM_DATA[1].

The location of each register is defined by an offset to be added to a base address, as shown in FIG. 23 in column 209 left of the ACPI-compliant register set 208. The address of the protocol register is equivalent to the base address.

Although a specification for an SMBus and a specification for a register set for ACPI-compatible operating systems has been published, it is desirable to provide a memory-efficient SMBus message handler, an integrated circuit chip and a respective method. Moreover, it is desirable to provide an SMBus test device for verifying the chip sets and a respective method.

SUMMARY OF THE INVENTION

According to one embodiment, an SMBus message handler comprises a memory for storing microcode which comprises at least two programs, each for handling a bus command protocol and comprising at least one instruction. The SMBus message handler further comprises an interface to a register for identifying a starting address of a program in the memory. An instruction fetch unit comprised in the SMBus message handler reads an instruction at an address in the memory. The address is specified by a program counter. Finally, the SMBus message handler comprises a finite-state machine which receives and interprets the instructions from the instruction fetch unit and manages the data transfer between an SMBus interface and a register set in compliance with the instructions read from the memory.

According to another embodiment, an integrated circuit chip for transmitting and receiving data over an SMBus comprises an interface to a memory which stores microcode which comprises at least two programs, each for handling a bus command protocol and comprising at least one instruction. The chip may be connected via an interface to a register for identifying a starting address of a program in the memory. Further, the chip comprises an instruction fetch unit for reading an instruction at an address in the memory which is specified by a program counter. Finally, the chip comprises a finite-state machine for receiving and interpreting the instructions and for managing the data transfer between an SMBus interface and a register set in compliance with the instructions read from the memory.

According to yet another embodiment, a method for controlling an SMBus comprises identifying a starting address of a program which comprises at least one instruction. The program is stored in a memory. The method further comprises fetching instructions of said program one after another into a finite-state machine. Finally, according to the method, data are transferred between an SMBus interface and a register set in compliance with the instructions present in the finite-state machine.

According to a further embodiment, an SMBus test device comprises a memory in which sequences of instructions are stored. The SMBus test device further comprises an SMBus interface to which a plurality of SMBus devices can be connected and an interface for inputting keys. Finally, a processor in the SMBus test device checks as to whether a key is input via the respective interface. Upon inputting of a key, the processor further checks as to whether said key can be mapped to a sequence of instructions for controlling devices connected to said SMBus interface or transferring data to or receiving data from said devices connected to said SMBus. Finally, the processor executes the sequence of instructions to which the key has been mapped.

According to yet a further embodiment, a method for controlling a testing system for SMBus chip set validation comprises checking as to whether a key is input from a second interface. Upon inputting of a key checking as to whether the key can be mapped to any sequence of instructions for controlling devices connected to an SMBus or transferring data to or receiving data from the devices connected to the SMBus. Finally, according to the method, the sequence of instructions to which said key has been mapped is executed.

BRIEF DESCRIPTION OF THE DRAWINGS

Further embodiments, advantages and objects of the present invention are defined in the appended claims and will become more apparent with the following detailed description when taken with reference to the accompanying drawings in which
FIG. 1 shows a generic SMBus packet protocol diagram;
FIG. 2 shows a quick command protocol;
FIG. 3 shows a send byte protocol;
FIG. 4 shows a send byte protocol with PEC;
FIG. 5 shows a receive byte protocol;
FIG. 6 shows a receive byte protocol with PEC;
FIG. 7 shows a write byte protocol;
FIG. 8 shows a write word protocol;
FIG. 9 shows a write byte protocol with PEC;
FIG. 10 shows a write word protocol with PEC;
FIG. 11 shows a read byte protocol;
FIG. 12 shows a read byte protocol with PEC;
FIG. 13 shows a read word protocol;
FIG. 14 shows a read word protocol with PEC;
FIG. 15 shows a process call protocol;
FIG. 16 shows a process call protocol with PEC;
FIG. 17 shows a block write protocol.

DETAILED DESCRIPTION OF THE INVENTION

Figure 18:
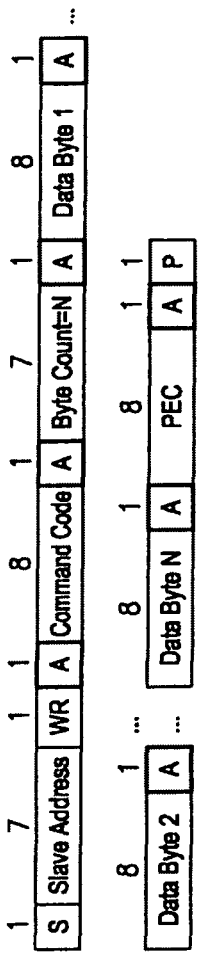
FIG. 18 shows a block write protocol with PEC.
Figure 19:
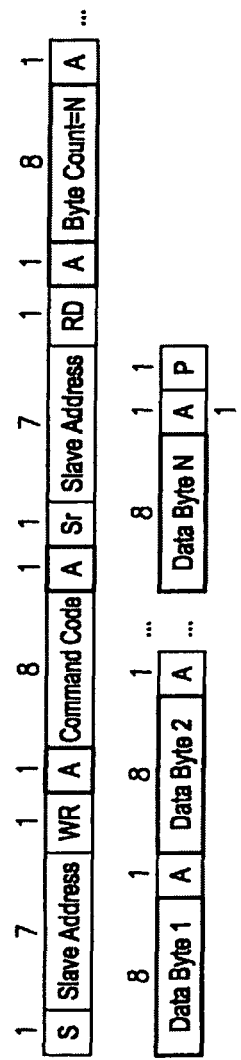
FIG. 19 shows a block read protocol.
Figure 20:
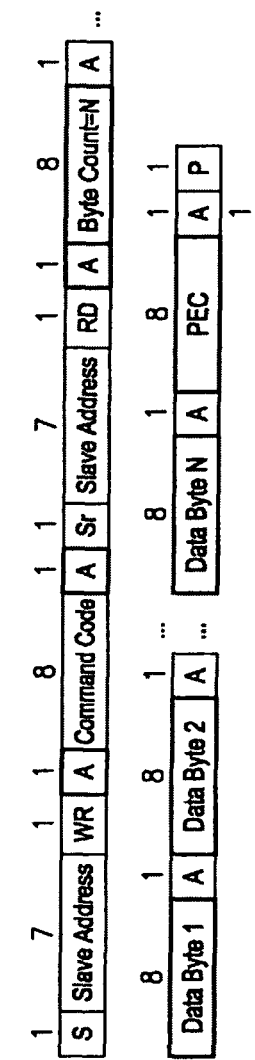
FIG. 20 shows a block read protocol with PEC.
Figure 21:
FIG. 21 shows a block write-block read process call protocol.
Figure 22:
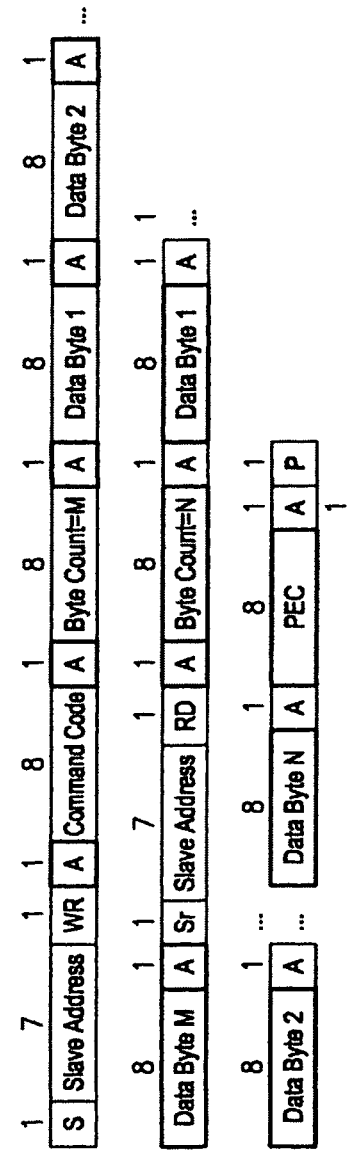
FIG. 22 shows a block write-block read process call protocol with PEC.

While the present invention is described with reference to the embodiments as illustrated in the following detailed description, as well as in the drawings, it should be understood that the following detailed description as well as the drawings are not intended to limit the present invention to the particular illustrative embodiment disclosed, but rather the described illustrative embodiments merely exemplify the various aspects of the present invention, the scope of which is defined by the appended claims.

As previously explained, an SMBus message handler comprises a finite-state machine which receives and interprets instructions stored in a memory and manages the data transfer between an SMBus interface and a register set in compliance with the instructions read from the memory. Moreover, this finite-state machine may be integrated into a circuit chip.

Moreover, an SMBus test device comprise an SMBus interface, a keyboard and a processor for mapping input keys to sequences of instructions. The instructions are executed and respective commands or data are sent or received via the SMBus interface.

Figure 23:
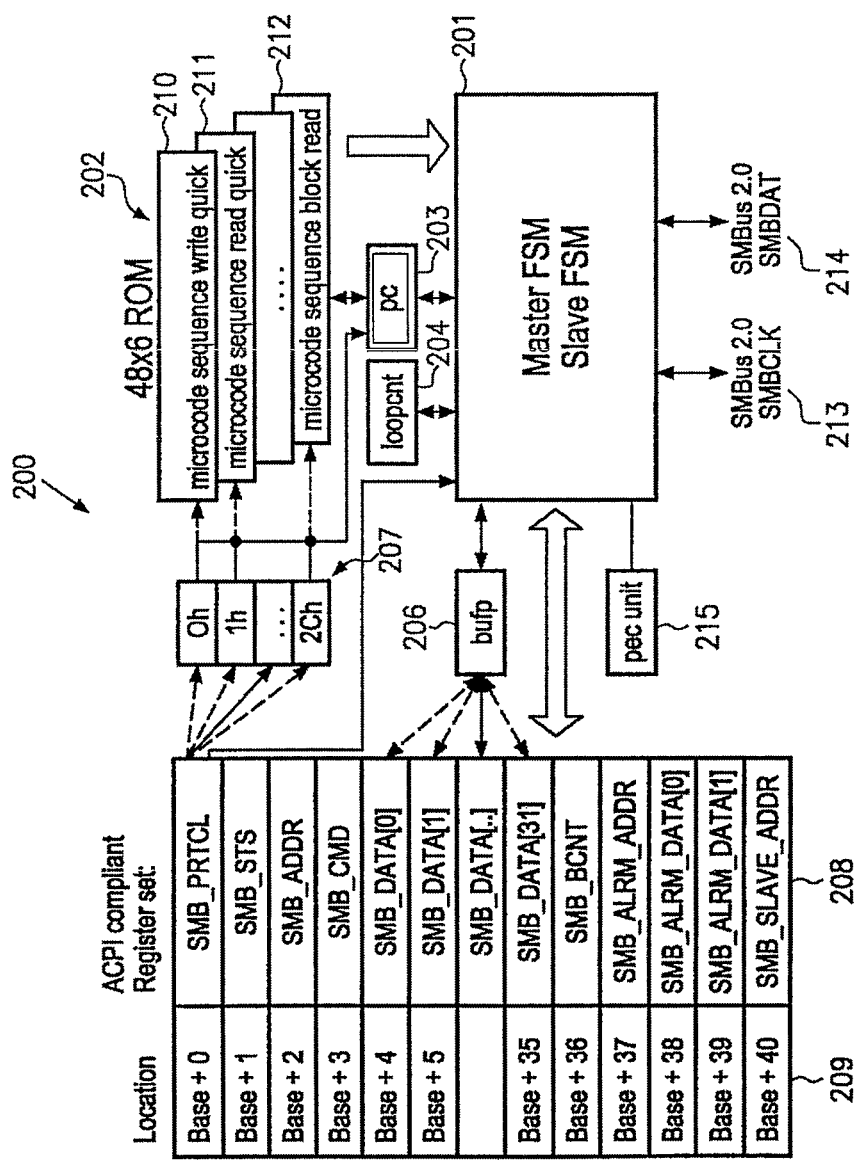
FIG. 23 shows a block diagram of an SMBus host controller.
Figure 24:
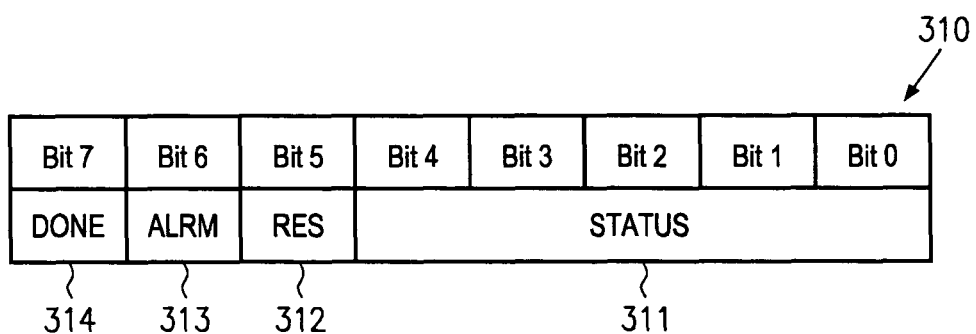
FIG. 24 shows the bits of a status register.

FIG. 23 shows a block diagram of an SMBus host controller 200. As explained above, the host controller comprises an ACPI-compliant register set 208. The memory address 209 of each register is specified by an offset of 0 to 40 to be added to a base address Base of the first register SMB_PRTCL. The host controller further comprises an address register array 207, a ROM 202 which stores several microcode sequences 210, 211 and 212, each comprising one or more instructions. The host controller comprises in addition a loop counter 204, an instruction fetch unit 203, including a program counter (designated "pc" in the box shown within instruction fetch unit 203), a finite-state machine 201, a buffer pointer 206, a PEC unit 215, and an SMBus interface comprising a clock line SMBCLK 213 and a data line SMBDAT 214.

As explained above, in compliance with the ACPI-embedded controller interface specification, an SMBus transaction is initiated by a write to the protocol register SMB_PRTCL. The value written may range from 01h to 0Dh excluding the most significant bit which specifies as to whether a PEC format or a non-PEC format should be used in hexadecimal format, indicated by the post-positioned "h". The seven least significant bits (LSBs) of the protocol register are used as a pointer to a cell within the address register array 207. The address register array 207, in turn, comprises pointers to each start of a microcode sequence which is illustrated by the dashed arrows from the address register array entries to the microcode sequences 210, 211, 212.

After a write to the protocol register, the value of the corresponding address register array cell is transferred to the program counter pc within the instruction fetch unit 203. The most significant bit of the protocol register is also fed into the finite-state machine (FSM) 201. Depending on the value of the MSB of the protocol register, the finite-state machine may use a PEC format or a non-PEC format protocol.

In an alternate embodiment two address register arrays may be provided. The first one comprises the starting address for microcode sequences for non-PEC format protocols whereas the second address register array comprises pointers to microcode sequences for PEC format protocols.

A buffer pointer register 206 comprises the offset value of one of the data registers SMB_DATA[ . . . ]. After a write to or read from one of the data registers, the buffer pointer register 206 bufp, is incremented by one so that the next read or write is performed to or from the next data register. That is providing or reading of data to one of the data registers SMB_DATA [bufp]. Additional connections between the individual registers of the register set 208 and the finite-state machines are provided so that the finite-state machine 201 can read or write to any register of the register set 208. In addition to the registers provided by the ACPI specification, an additional register SMB_SLAVE_ADDR for the slave address is provided at an offset of 40 with respect to the base address of the register set.

Figure 25:
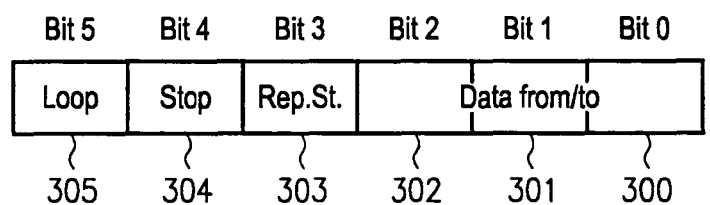
FIG. 25 shows a sixbit instruction for the finite-state machine.

An implementation of the instructions used for the microcode sequences is shown in FIG. 25. Table 3 comprises microcode sequences for non-PEC formats. The three least significant bits (LSB) 300, 301, 302 specify the register from which data are transferred to the SMBus interface 213, 214 or to which data received from the SMBus interface are written to. Table 2 illustrates the meanings of bits 300, 301, 302.

TABLE 2

| 0 | None |
| 1 | Transmit data from SMB_ADDR with a bit value of 1 at the R/W bit position |
| 2 | Transmit data from SMB_ADDR with a bit Value of 0 at the R/W bit position |
| 3 | Transmit data from SMB_CMD |
| 4 | Transmit data from SMB_BCNT, set loopcnt = SMB_BCNT |
| 5 | Transmit data from SMB_DATA[bufp], increment bufp |
| 6 | Receive data to SMB_DATA[bufp], increment bufp |
| 7 | Receive data to SMB_BCNT, set loopcnt = SMB_BCNT |

If Bit 3 is 1, a repeated START condition will be generated on the SMBus interface. If, on the other hand, the latter bit is zero, no repeated START condition will be generated.

If the value of Stop Bit 4 304 is 1 and the host controller acts as a transmitter, a STOP condition will be generated upon receiving ACK If the SMBus host controller is in receiver mode, NACK and a STOP condition is generated. If Bit 4 is zero, no STOP condition will be generated. If Bit 4 of an instruction has a value of 1, this means that this instruction is the last instruction in a microcode sequence. After that instruction, the protocol register SMB_PRTCL is set to zero.

If the most significant Loop Bit 5 305 has a value of zero, an instruction is only executed once. That means that after the execution the program counter pc within the instruction fetch unit 203 is incremented by one and the next instruction is fetched. If bit 5 has a value of 1, the instruction remains in the finite-state machine 201 until the loop counter 204 becomes zero. Each time the instruction is executed, the loop counter loopcnt is decremented by one. For each START or repeated START condition, the loop counter is set to one for non-I²C transactions or set to SMB_BCNT for I²C transactions. Moreover, whenever an access to the SMB_BCNT register occurred, loop counter 204 is set to SMB_BCNT.

Whenever a START or repeated START condition is generated, the buffer pointer register 206 bufp is set to 04h, which is the offset of the data register SMB_DATA[0]. Whenever an access to the data register, i.e. reading or writing, occurred, the buffer pointer register will be incremented.

TABLE 3

| SMB_PRTCL | Command | ROM-Address | Microcode (binary) | Start | Remarks |
|---|---|---|---|---|---|
| 02h | Write Quick | 0h | 01_0010 | S | bufp = 4; loopcnt = 2 |
| 03h | Read Quick | 1h | 01_0001 | S | bufp = 4; loopcnt = 2 |
| 04h | Send Byte | 2h | 00_0001 | S | bufp = 4; loopcnt = 2 |
|  |  | 3h | 01_0011 |  |  |
| 05h | Receive Byte | 4h | 00_0001 | S | bufp = 4; loopcnt = 2 |
|  |  | 5h | 01_0110 |  |  |
| 06h | Write Byte | 6h | 00_0010 | S | bufp = 4; loopcnt = 2 |
|  |  | 7h | 00_0011 |  |  |
|  |  | 8h | 01_0101 |  |  |
| 07h | Read Byte | 9h | 00_0010 | S | bufp = 4; loopcnt = 2 |
|  |  | Ah | 00_0011 |  |  |
|  |  | Bh | 00_1001 | Sr | bufp = 4; loopcnt = 2 |
|  |  | Ch | 00_0110 |  |  |
| 08h | Write Word | Dh | 00_0010 | S | bufp = 4; loopcnt = 2 |
|  |  | Eh | 00_0011 |  |  |
|  |  | Fh | 11_0101 |  |  |
| 09h | Read Word | 10h | 00_0010 | S | bufp = 4; loopcnt = 2 |
|  |  | 11h | 00_0011 |  |  |
|  |  | 12h | 00_1001 | Sr | bufp = 4; loopcnt = 2 |
|  |  | 13h | 11_0110 |  |  |
| 0Ah | Write Block | 14h | 00_0010 | S | bufp = 4; loopcnt = 2 |
|  |  | 15h | 00_0011 |  |  |
|  |  | 16h | 00_0100 |  | loopcnt = SMB_BCNT |
|  |  | 17h | 11_0101 |  |  |
| 0Bh | Read Block | 18h | 00_0010 | S | bufp = 4; loopcnt = 2 |
|  |  | 19h | 00_0011 |  |  |
|  |  | 1Ah | 00_1001 | Sr | bufp = 4; loopcnt = 2 |
|  |  | 1Bh | 00_0111 |  | loopcnt = SMB_BCNT |
|  |  | 1Ch | 11_0110 |  |  |
| 0Ch | Process Call | 1Dh | 00_0010 | S | bufp = 4; loopcnt = 2 |
|  |  | 1Eh | 00_0011 |  |  |
|  |  | 1Fh | 10_0101 |  |  |
|  |  | 20h | 00_1001 | Sr | bufp = 4; loopcnt = 2 |
|  |  | 21h | 11_0110 |  |  |
| 0Dh | Block Write-Block Read Process Call | 22h | 00_0010 | S | bufp = 4; loopcnt = 2 |
|  |  | 23h | 00_0011 |  |  |
|  |  | 24h | 00_0100 |  | loopcnt = SMB_BCNT |
|  |  | 25h | 10_0101 |  |  |
|  |  | 26h | 00_1001 | Sr | bufp = 4; loopcnt = 2 |
|  |  | 27H | 00_0111 |  | loopcnt = SMB_BCNT |
|  |  | 28h | 11_0110 |  |  |
| 4Ah | Block Write I2C | 29h | 00_0010 | S | bufp = 4; loopcnt = SMB_BCNT |
|  |  | 2Ah | 00_0011 |  |  |
|  |  | 2Bh | 11_0101 |  |  |
| 4Bh | Block Read I2C | 2Ch | 00_0010 | S | bufp = 4; loopcnt = SMB_BCNT |
|  |  | 2Dh | 00_0011 |  |  |
|  |  | 2Eh | 00_1001 | Sr | bufp = 4 |
|  |  | 2Fh | 11_0110 |  |  |

The left column of Table 3 comprises the value of the seven least significant bits of the protocol register SMB_PRTCL. The second column comprises the name of the protocol. The third column comprises the hexadecimal address in ROM 202. The fourth column comprises the 6-bit binary microcode instructions. An "S" in the fifth column designates a START condition, whereas an "Sr" in this column designates a repeated START condition. The right column illustrates the values to which the buffer pointer register bufp 206 and the loop counter 204 are set. Skilled practitioners will appreciate that an additional bit may be added for reads or writes to the PEC unit 215 and how the microcode sequences may be supplemented in order to handle the PEC formats of the SMBus protocols.

Figure 26:
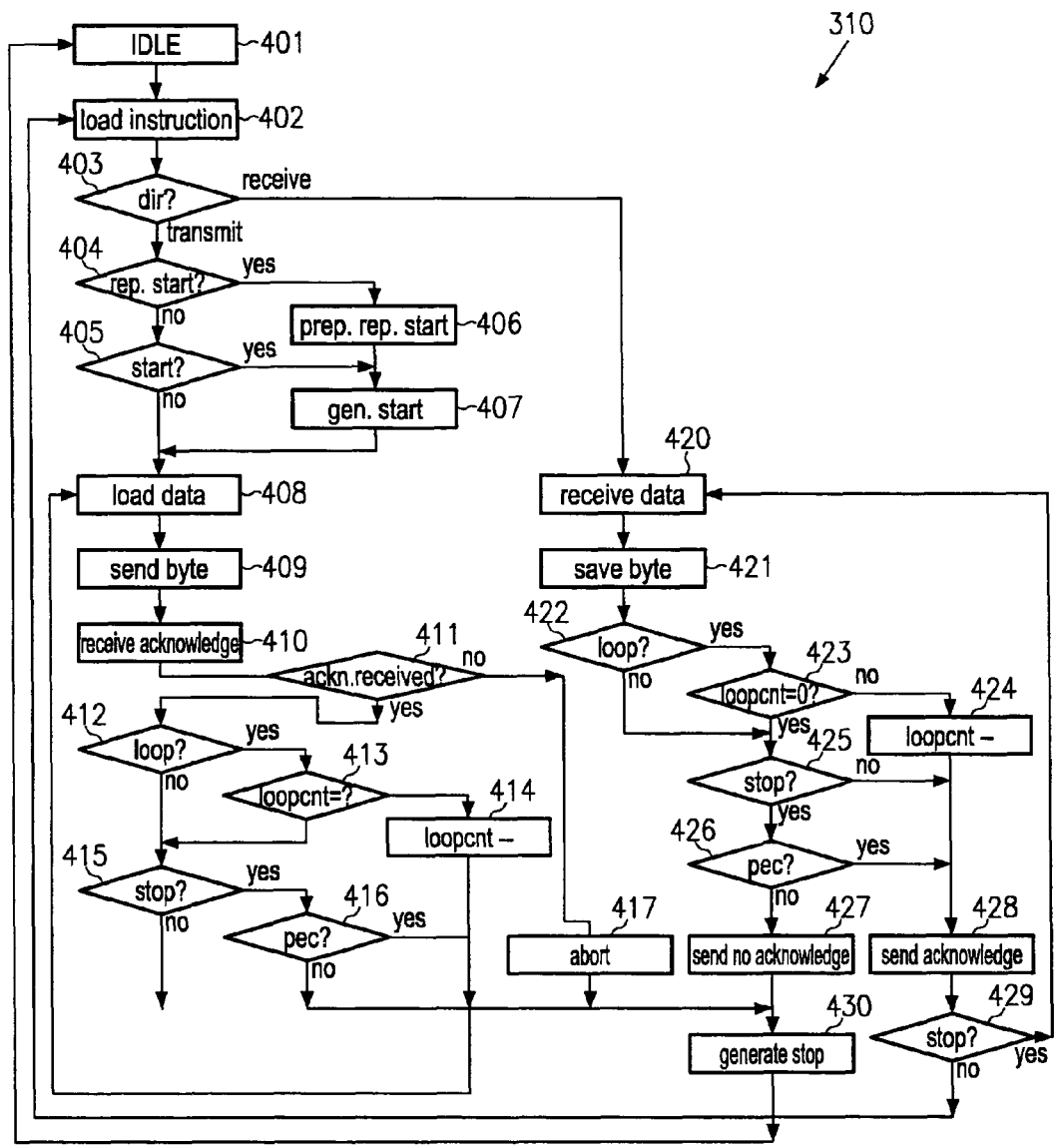
FIG. 26 shows a block diagram of a master finite-state machine.

FIG. 26 shows a flow chart 400, which illustrates the operation of a master finite-state machine 201. Usually the finite-state machine is in idle mode 401. After a write to the protocol register, the address of the first instruction of the microcode is obtained from the address register array and the first instruction of the microcode sequence is loaded in step 402. In step 403 it is determined whether data are to be received from the SMBus interface or data are to be transmitted to the SMBus interface. If data are to be transmitted, it is further checked as to whether a repeated START condition is to be generated in step 404, and if that is the case, the repeated START condition is prepared in step 406. If no repeated START condition is to be generated, it is checked in step 405 as to whether a START condition is to be generated, and if that is the case, the START condition is generated in step 407. If a repeated START condition has been prepared in step 406, also a START condition is generated in step 407.

Then, in step 408, the data from the respective register of the ACPI-compliant register set 208 are loaded. In step 409, a byte of data is sent to the SMBus interface. In step 411, it is decided as to whether in step 410 an ACK has been received. If no ACK was received, the protocol is aborted in step 417 and a STOP is generated in step 430.

If an acknowledgment has been received in step 411, it is checked in step 412 as to whether Bit 5, 305 has a value of one. If this is the case, it is determined in step 413 as to whether the loop counter loopcnt 204 is equivalent to zero. If this is not the case, loopcnt is decremented by one in step 414, and the next loading of a data byte in step 408 takes place from a register of the ACPI-compliant register set.

If either Bit 5, 305 has a value of zero or loopcnt is equivalent to zero, it is determined in step 415 as to whether Stop Bit 4, 304 is set. If this is the case, it is checked in step 416 as to whether a PEC format is to be used. If the Stop Bit 4 has a value of zero the follow proceeds from step 415 to step 402 i.e. the next instruction is loaded from memory 202. If it is decided in step 416 that a PEC format is to be used then the PEC data byte is loaded in step 408. If a non-PEC format is to be used, a stop condition is generated in step 430.

If it is decided in step 403 that data are to be received from the SMBus interface the flow proceeds to step 420 in which a data byte is received from the SMBus interface. This data byte is saved to one of the registers of the ACPI-compliant register set in step 421.

Steps 422 to 426 are similar to steps 412 to 416, respectively. However, after it is decided in step 426 that a non-PEC format is to be used, a NACK is sent in step 427 after step 426. If it is determined in step 423 that the loop counter loopcnt is not zero or it is determined in step 425 that the Stop Bit 4, 304 has a value of zero or it is determined that a PEC format is to be used in step 426, an ACK is sent in step 428. Then it is decided in step 429 as to whether Stop Bit 4, 304 is set or not. If it has a value of one then the flow proceeds to step 420 in which the next data byte is received from the SMBus interface. If the Stop Bit 4 has a value of 0, the flow proceeds to step 402 in which the next instruction is loaded from memory 202.

Figure 27:
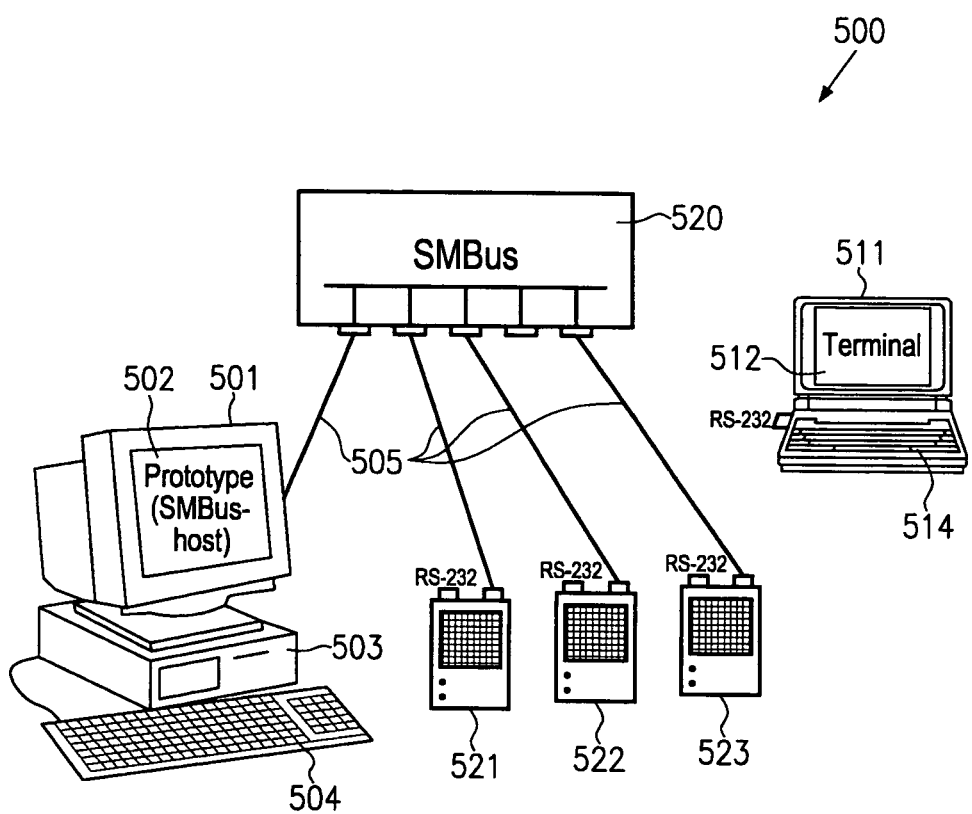
FIG. 27 shows an overview of a test device.

FIG. 27 shows a test hardware 500 for chip set validation. It comprises a SMBus connector 520, an SMBus host 501, rapid development boards 521, 522 and 523. The SMBus host 501 comprises a personal computer (PC) including a screen 502, a casing 503 including a processor memory and a keyboard 504. The SMBus interfaces 505 of the SMBus host 501 and the rapid development boards 521 to 523 are connected to the SMBus connector 520. The SMBus connector connects the clock lines SMBCLK and the data lines SMBDAT and the optional alert line SMBALERT# of each of the SMBus interfaces. In addition, pull-up resistors of 10 (are provided in the SMBus connector 520 in compliance with the SMBus specification, section 2.

The rapid development boards are provided in addition to the SMBus interface with an RS-232 interface via which the rapid development boards can be connected to another terminal 511 which may be PC having a display 512 and a keyboard 514. In one embodiment phyCORE-591 may be used for the rapid development boards. phyCORE-591 can be ordered from PHYTEC. This board is equipped with a Philips Processor 8xC591 which implements the I²C hardware which is used to test the capabilities of the SMBus host. A software may be run on terminal 511 which forwards every key input into terminal 511 by keyboard 514 via the RS-232 interface to one of the rapid development boards. The software may further display any character or byte received by the RS-232 interface on display 512. In addition, not only or alternatively do the bytes received by the RS-232 interface an explanation may be shown on display 212. Further, the software may provide different options so that different categories of bytes received by the RS-232 interface may be displayed or not displayed.

Figure 28:
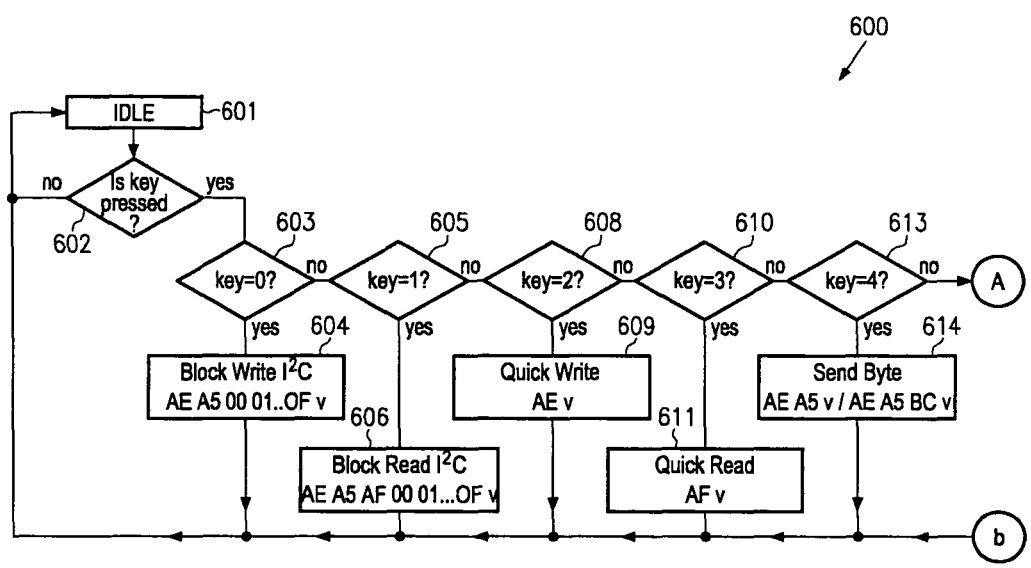
FIGS. 28 to 32 show flow diagrams for mapping keys to instruction sets.
Figure 29:
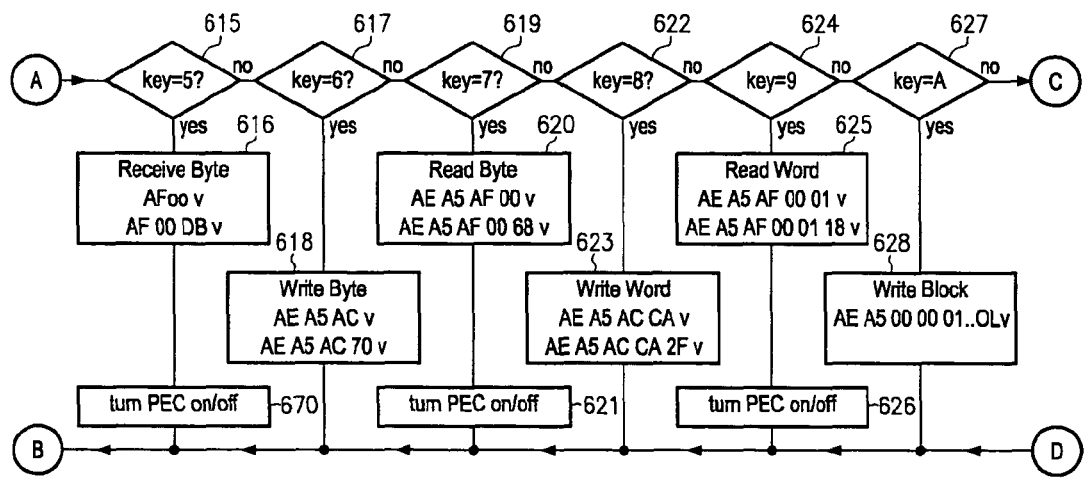
Figure 30:
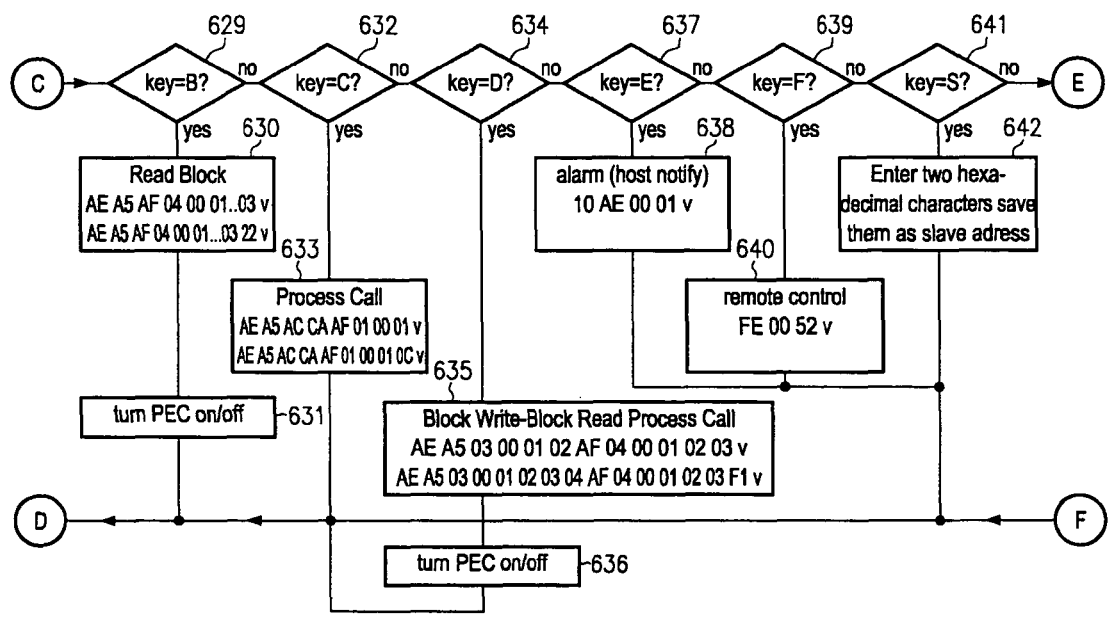
Figure 31:
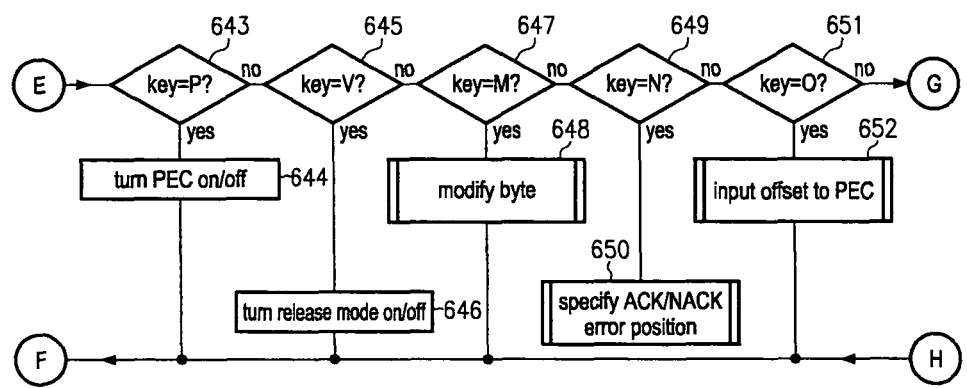
Figure 32:
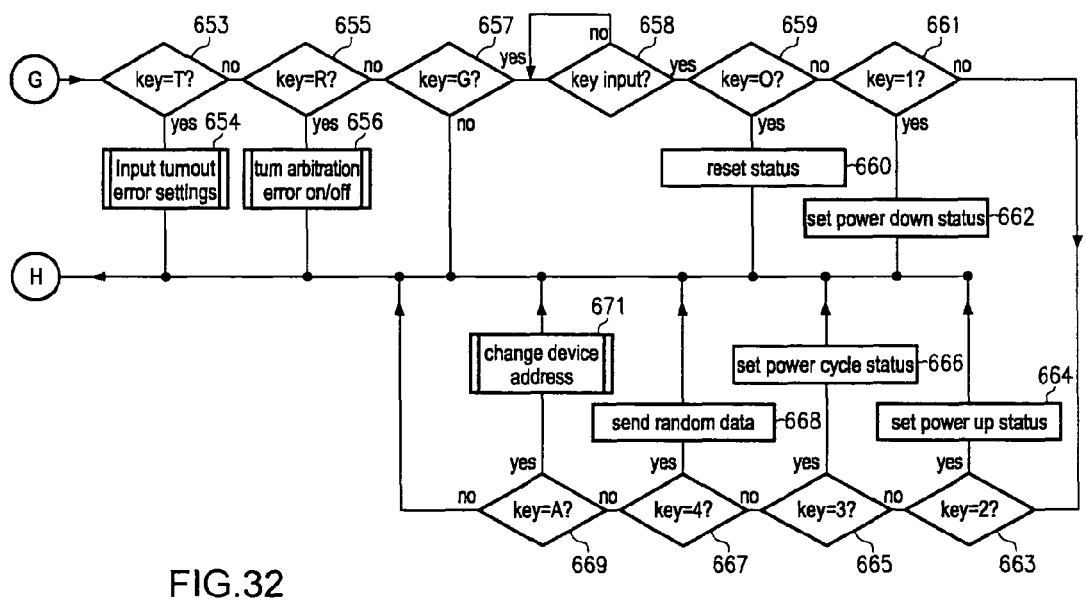

FIG. 28 to 23 show a flow-chart illustrating the operation of the user interface of the SMBus test equipment. The steps shown in FIGS. 28 to 32 may be performed by the processor of the SMBus host if the keys are input into keyboard 504. In another embodiment the steps of FIGS. 28 to 32 may be performed by the processor of the rapid development board if the depressing of keys on keyboard 514 is echoed on the RS-232 interface.

Usually, the test device is in idle state 601. If it is determined in step 602 that a key is pressed it is determined in steps 603, 605, 608, 610, 613, 615, 617, 619, 622, 624, 627, 629, 632, 634, 637, 639, 641, 643, 645, 647, 649, 651, 653, 655 and 657 which key is depressed and as to whether an instruction is associated with that key.

If it is determined in step 603 that a "0" was input an block write according to the I²C specification is executed in step 604. That means the data as indicated in the lower line of block 604 in hexadecimal format are written to the SMBus interface. A "v" at the end of the data is short for an ACK. The slave device will receive incoming data till the recognition of a stop condition. If it is determined in step 601 that a "1" was input an I²C command block read is executed. That means that the test device will transmit data bytes from its auxiliary RAM starting at offset zero until the recognition of a NACK transmitted by the master. The lower line of block 606 indicates the data which may be transmitted from the slave device to the test device in hexadecimal format. The "v" at the end of the data stream indicates an ACK. Then in step 607 PEC is turned on or off which means that a non-PEC format is chosen if a PEC format has been chosen up to now or vice versa.

If "2" is input, what is determined in step 608, a quick write is executed in step 609 that means that the data byte AEh is transmitted by the master and the slave device acknowledges its own address. If "3" is input, determined in step 610, a quick read is performed in step 611 which means that the data byte AFh is transmitted from the master and the slave acknowledges its own address. Then in step 612 PEC is turned on or off.

If it is determined in step 613 that "4" is input a send-byte command is executed in step 614 which means that the data in lines 2 or 3 are transmitted by the master depending as to whether a non-PEC or PEC format is chosen. If it is determined in step 615 that "5" is input, a receive byte protocol is executed in step 616. The test device receives the first data byte of the auxiliary RAM of a slave device. That means depending on the format, the bytes indicated in the $2^{nd}$ or $3^{rd}$ lines of block 616 are transmitted via the SMBus. Then, as indicated in step 670 the PEC is turned on or off.

If it is determined in step 617 that a "6" is input, a write byte command is executed as shown in block 618. If "7" is input, a read byte protocol is executed in step 620 as always, the data which may be transferred over the SMBus are indicated in lines 2 or 3 of block 620. Then in step 621 the PEC is turned on or off.

If "8" is input, which is determined in step 622, a write word command is executed in step 623. If "9" is pressed (step 624), a read word command is executed in step 625 and the PEC is turned on or off in step 626.

If it is determined in step 627 that an "A" is input, a write block protocol is executed in step 628. If "B" is input (step 629), a read block protocol is executed in step 630 and subsequently in step 631 the PEC is turned on or off (step 634). If a "C" is input (step 632), a process call protocol is performed in step 633. If a "D" is input (step 634), a block write-block read process call is executed in step 635 and the PEC is turned on or off in step 636. If an "E" is input (step 637), the host is notified of an alarm in step 638. That is performed by the data sequence of line 2 of block 638 in hexadecimal format. 10h is the host notify address, AEh is the own address and 00h 01h are two data bytes.

The transmission of a remote control message is started by pushing "F" which is determined in step 639. The message is basically in a write byte protocol the data transmitted depends on the currently selected remote control device address and status which may be changed by pressing "G" which is determined in step 657. The following table 4 illustrates the remote control status codes and the data transmitted.

TABLE 4

| Status | Command code | Data byte |
|---|---|---|
| power cycle | 03h | 82h |
| power down | 02h | 6Eh |
| power up | 01h | 65h |
| Reset | 00h | 52h |
| send random data | ??h | ??h |

A change of the slave address may be initiated by pressing "S" which is determined in step 641. Then in step 642 a two digit hexadecimal number may be input as illustrated e.g. in FIG. 35 in connection with inputting of an offset to the PEC.

When a "P" is input which is checked in step 643, the PEC is turned on or off in step 644. The verbose mode may be turned on or off by pressing a "V" in step 645. If the verbose mode is turned on in steps 646 which is by the way the default case then every single byte of a SMBus message will be echoed on screen 502 or transmitted via the RS-232 interface to terminal 512.

Entering a "M" which is determined in step 647, lets the user modify a single byte in the auxiliary RAM in the imbedded controller which is used to store outgoing message data. Step 648 is illustrated in greater detail in FIG. 33. An acknowledgment error feature may be turned on by pressing "N" which is determined in step 649. Then an ACK or NACK error position may be specified in step 650 which will be explained in more detail in connection with FIG. 34. When "O" is pressed which is determined in steps 641, an offset to PEC may be input in step 652 which is explained in more detail in connection with FIG. 35. When "T" is input which is determined in step 653 time out error settings may be input in step 654 which is illustrated in more detail in connection with FIG. 36. Pressing "R" which is determined in step 655 turns an arbitration error on or off (step 656).

Pressing "G" which is determined in step 657 lets the user change the remote control settings. After step 657 the test device waits in step 658 for the input of another key. It is checked in steps 659, 661, 663, 665, 667 and 669 as to whether an action is associated with the key inputted.

If the key is "0", the status is re-set in step 660 i.e. a write byte protocol is executed wherein a 00h command code and 52h data byte (confer table 4) is sent.

If "1" is input, which is determined in step 661, a power down status is set in step 662. The bytes sent in the write byte protocol are displayed in line 2 (excluding the headline row) of table 4.

If "2" is input, which is determined in step 663, a power up status is set in step 664 (confer line 3 of table 4). If "3" is input, as checked out in step 665, a power cycle status is set in step 666 (confer line 1 of table 4) If, "4" is input, (step 667), random data are sent in step 668. If it is found out that an "A" is input in step 669 the device address may be changed in step 671 as will be explained in more detail in connection with FIG. 37.

Figure 33:
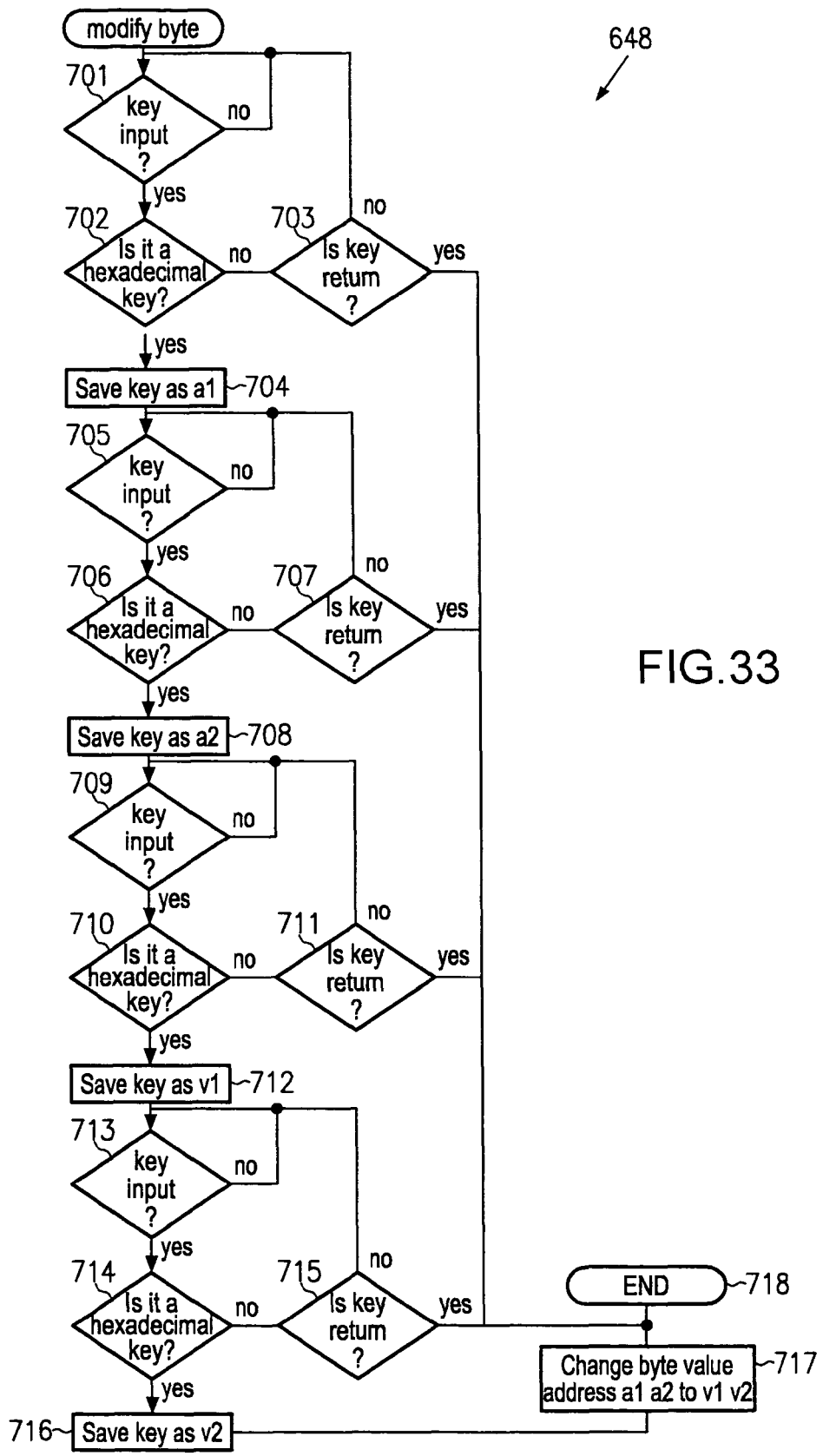
FIG. 33 shows a flow chart for modifying a single byte in the auxiliary RAM of the embedded controller.

FIG. 33 illustrates the modify byte operation in step 648. The test equipment waits in step 701 for the input of a key. Then it is checked in step 702 as to whether the key is hexadecimal key. A hexadecimal key is either a number between 0 and 9 or a character between A and F. If a hexadecimal key is input, its value is saved as a1 for later use in step 704. If a non-hexadecimal key is input, the flow proceeds to step 703 where it is determined as to whether return is input. If that is the case, the flow proceeds to the end in steps 718. If it is determined in step 703 that a key different from the return keys input, the test equipment waits in step 701 for the input of another key.

Steps 705 to 708, 709 to 712 and 713 to 716 are similar to steps 701 to 704. However, the key input in step 705 is saved as a2 for later use, the key input in step 709 is saved as v1 for later use in step 712 and the key input in step 713 is saved for later use in step 716 as v2. Finally in 717 a single byte in the auxiliary RAM of the embedded controller is changed which is used to store outgoing message data. a1 constitutes the 4 MSBs and a2 the 4 LSBs of the hexadecimal address in the RAM and v1 v2 the 4 MSBs and the 4 LSBs, respectively, of the value itself. If instead of a hexadecimal key return is pressed the flow doesn't proceed to step 717 so the original value is maintained.

Figure 34:
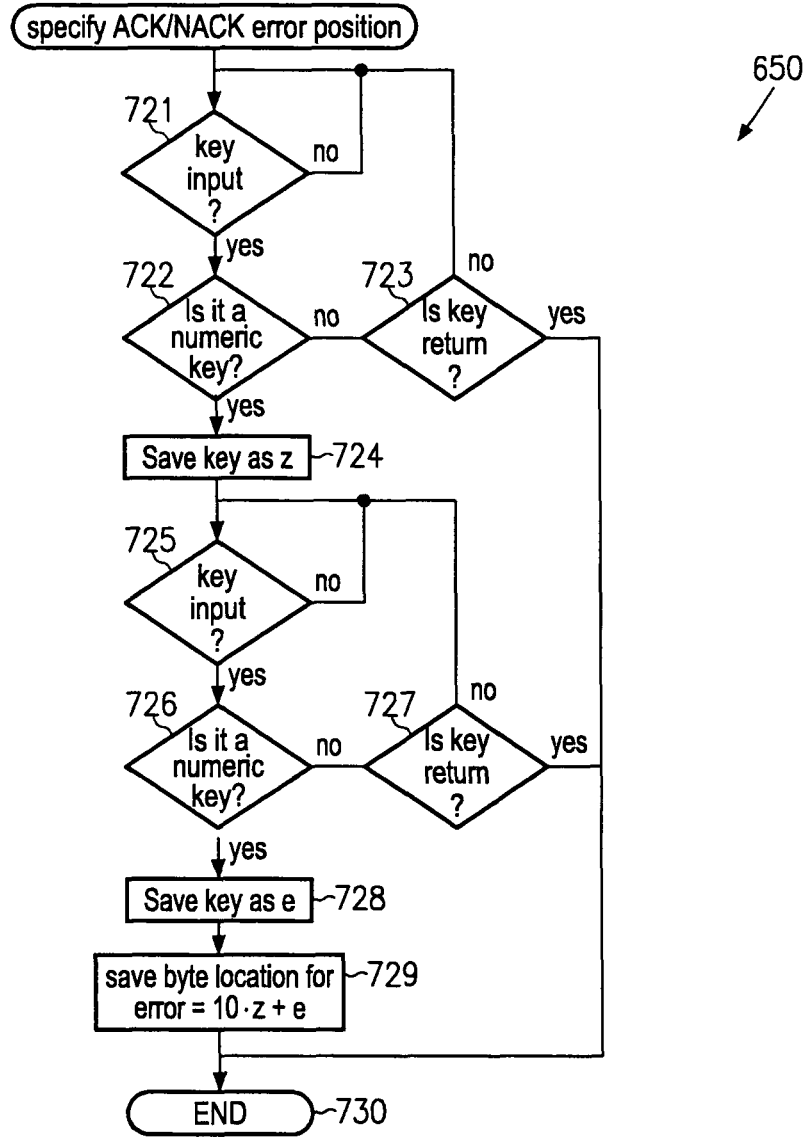
FIG. 34 shows a flow chart for controlling the sending of wrong acknowledgments or non-acknowledgments.

FIG. 34 illustrates step 650 in which a ACK or NACK position may be specified. Steps 721 to 724 and steps 725 to 728 are similar to steps 701 to 704 in FIG. 33. However, it is checked in step 722 and 726 as to whether a numeric key, that is a number between 0 and 9 is input. The first number input in step 721 and saved in step 724 for later use as "z", which will form the tens and the second number input in step 725 and saved for later use in step 728 as "e" forms the ones of the byte location for the error. The byte location for the error is saved in step 729.

Figure 35:
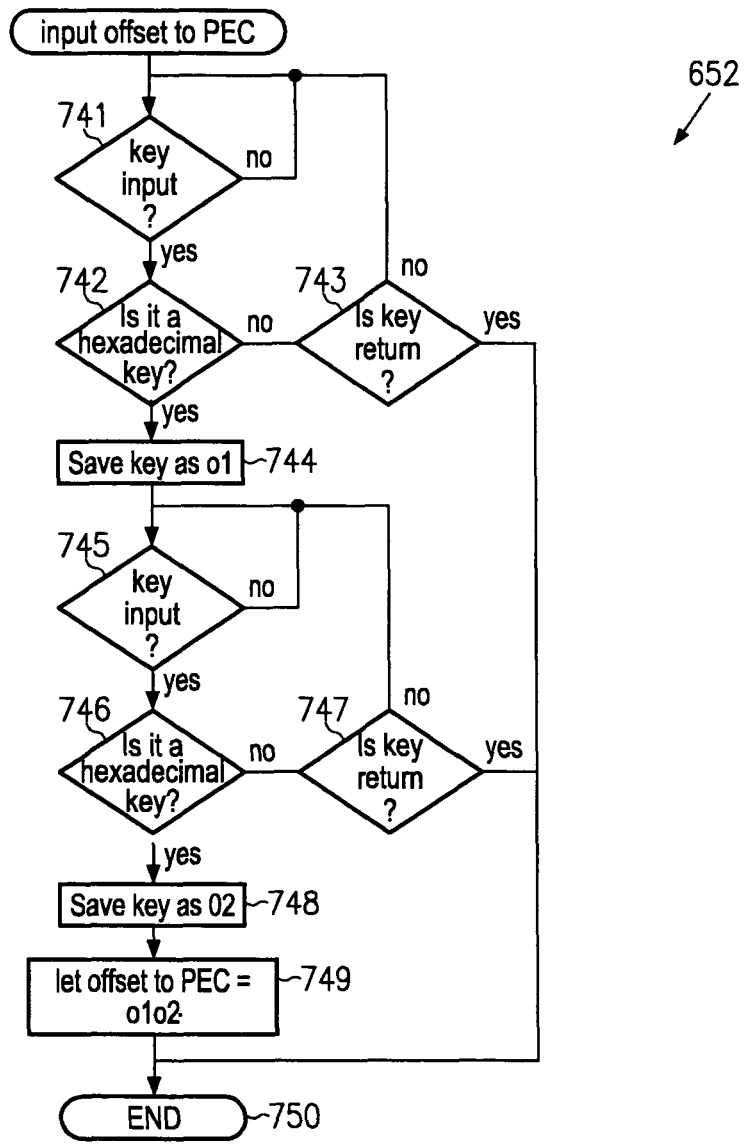
FIG. 35 shows a flow chart for inputting an offset to PEC.

FIG. 35 illustrates step 652 for inputting an offset to the PEC. The whole procedure is similar to the one shown in FIG. 34. However, this procedure accepts hexadecimal keys in step 742 and 746. The key input in step 741 constitute the four most significant bits whereas the key input in step 745 constitutes for least significant bits of the offset to be added to the PEC byte (749).

Figure 36:
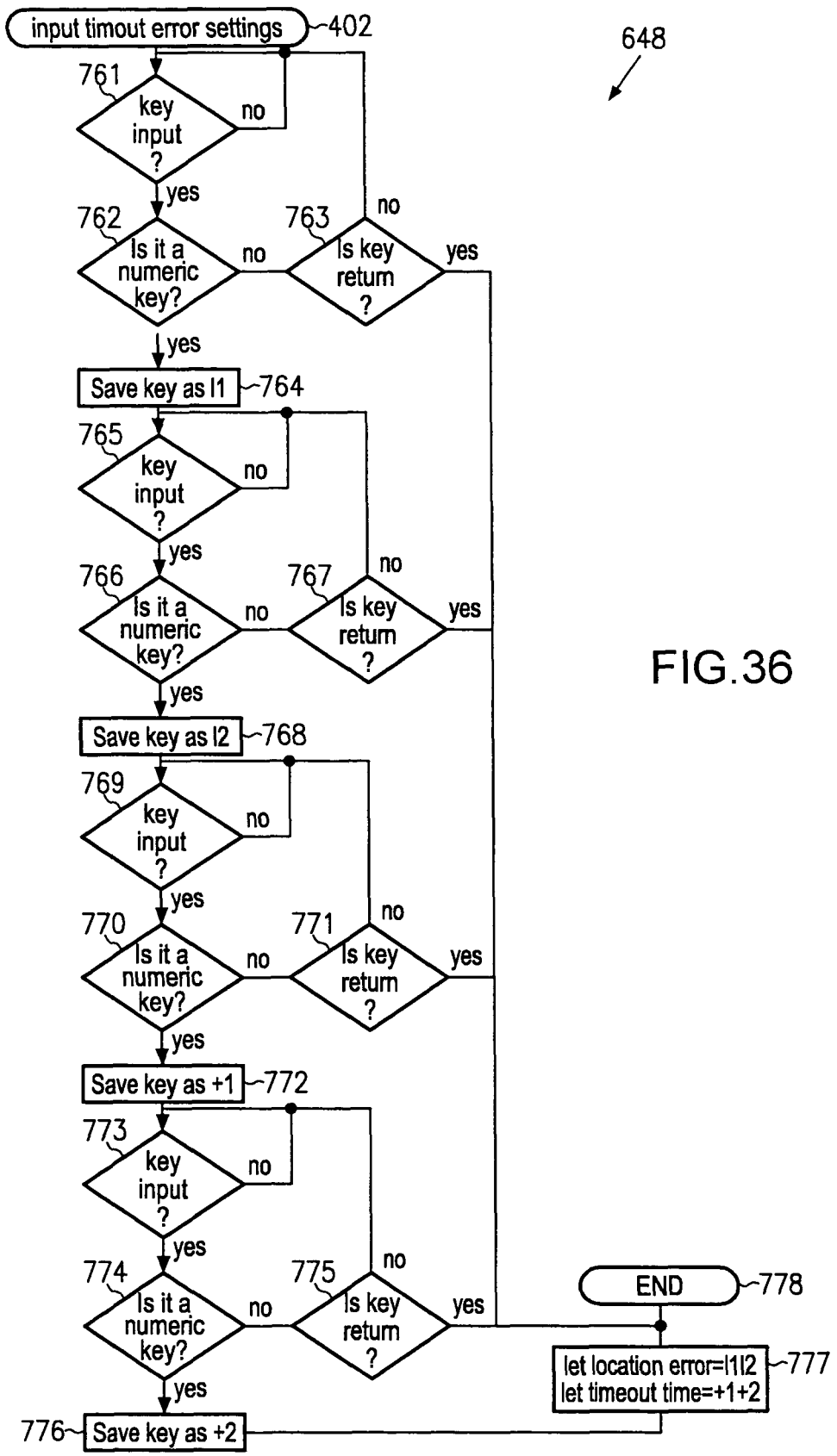
FIG. 36 shows a flow diagram for inputting timeout error settings.

FIG. 36 illustrates step 654 for inputting the time-out error settings. This procedure is similar to the one shown in FIG. 33. However, step 762, 766, 770 and 774 accept numeric keys only. The first number input and saved as I1 in step 764 will form the tens whereas the second number saved in step 768 for later use as I2 will form the ones of the error location (step 777). The third numeric key saved as t1 in step 772 will form the tens and the fourth numeric key t2 will form the ones of the time-out time. If the time-out error is turned on by pushing T the SMBCLK line will be pulled down for a given time, while the host is waiting for the acknowledge of the last byte.

Figure 37:
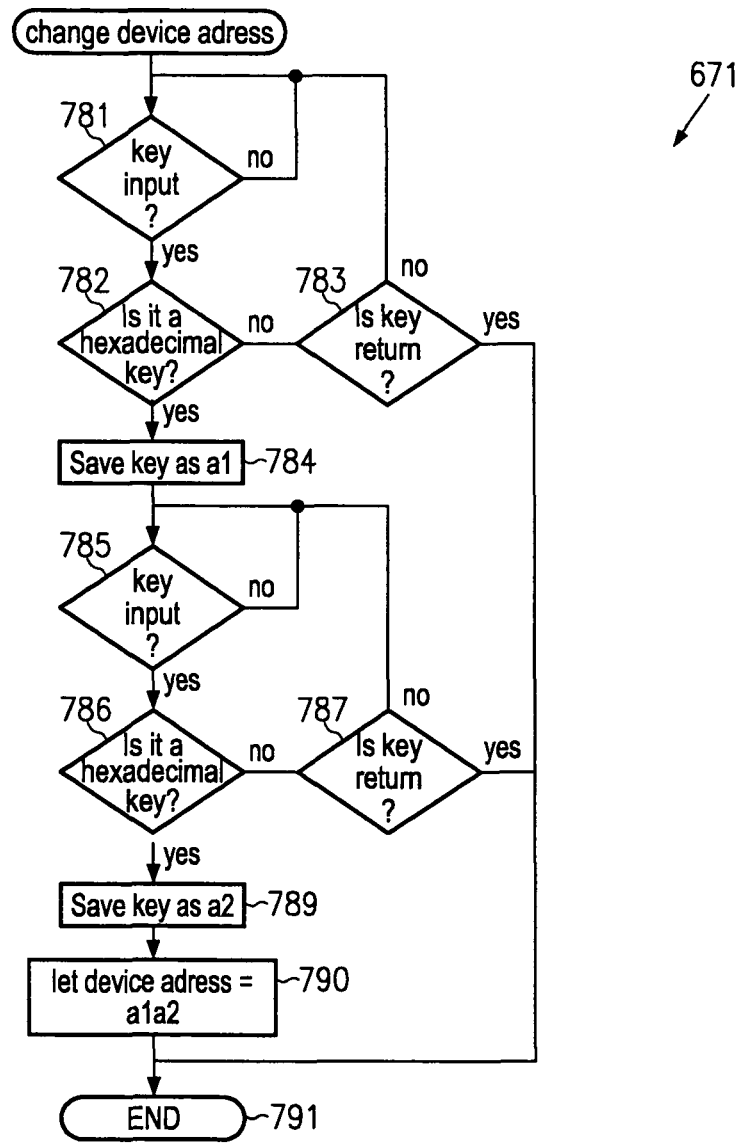
FIG. 37 shows a flow diagram for inputting a new device address.

FIG. 37 illustrates the change of a device address in step 671. This flow-chart is similar to the flow-chart shown in FIG. 35. The first hexadecimal key a1 inputted will form the four most significant bits of the new device address, whereas the second hexadecimal will key a2 the four least significant bits of the new device address which is stored in step 790. If return instead of a hexadecimal is pressed, no change takes place.

In a further embodiment, the command as indicated in the first line of step 604, 606, 609, 611, 614, 616, 618, 620, 623, 625 and 628 may be echoed on the RS-232 interface and then be displayed on screen 512 of terminal 511. Furthermore, the data bytes send and received by the SMBus as indicated in the $2^{nd}$ and $3^{rd}$ lines of the above-identified blocks, may be echoed on the RS-232 interface and also be displayed on the screen 512. Also the SMBus host 501 may display the commands and/or the data bytes sent by the SMBus on its display.

Further modifications and variations of the present invention will be apparent to those skilled in the art in view of this description. Accordingly, this description is to be construed as illustrative as only and is for the purpose of teaching those skilled in the art the general manner of carrying out the present invention.

The invention claimed is:

1. An SMBus host controller comprising:
   an SMBus interface; and
   an SMBus message handler including:
   a memory storing microcode comprising at least two programs each for handling a bus command protocol, each program comprising at least one instruction;
   an interface to a register configured to identify a starting address of a program in said memory;
   an instruction fetch unit configured to read an instruction at an address in said memory, said address being specified by a program counter;
   a finite-state machine configured to receive and interpret the instructions read by said instruction fetch unit and manage the data transfer between the SMBus interface and a register set in compliance with said instructions read from said memory; and
   an address register array comprising a plurality of starting addresses of programs stored in said memory, said register comprising an offset for pointing at a specific register in said address register array.

2. The SMBus host controller of claim 1, wherein said register set complies with the ACPI specification.

3. The SMBus host controller of claim 2, further comprising a buffer pointer register for pointing at one of a plurality of data registers said finite-state machine transferring data read from the SMBus interface to the data register at which said buffer pointer register points if said finite-state machine interprets a reception instruction; said finite-state machine transferring the data read from the data register at which said buffer pointer register points to said SMBus interface if said finite-state machine interprets a transmission instruction.

4. The SMBus host controller of claim 3, wherein the finite-state machine causes said buffer pointer register to be incremented each time a reception instruction or a transmission instruction is executed.

5. The SMBus host controller of claim 1, further comprising a loop counter for storing the value of a block counter register in said loop counter if the finite-state machine executes an instruction to transmit data from said block counter register to said SMBus interface, said loop counter being decremented each time a data byte is transmitted to said SMBus interface while an instruction to transmit data from said block counter register to said SMBus interface is executed, wherein the instruction to transmit data from said block counter register to said SMBus interface is completed when the value of said loop counter reaches zero.

6. The SMBus host controller of claim 1, further comprising a loop counter and a block count register both for storing a byte received from said SMBus interface if the finite-state machine executes an instruction to receive data at said block counter register from said SMBus interface, said loop counter being decremented each time a data byte is transmitted to or received from said SMBus interface while an instruction to receive data at said block counter register from said SMBus interface is executed, wherein the instruction to receive data at said block counter register from said SMBus interface is completed when the value of said loop counter reaches zero.

7. The SMBus host controller of claim 1, wherein each instruction comprises one bit indicating as to whether or not an instruction is the last instruction in the program.

8. The SMBus host controller of claim 1, wherein each instruction comprises one bit indicating as to whether an instruction is to be executed only once or this instruction is to be executed repeatedly until a loop counter becomes zero, wherein said loop counter is decremented each time an instruction is executed repeatedly.

9. The SMBus host controller of claim 1, wherein the memory storing microcode is a read-only memory.

10. An integrated circuit chip for transmitting and receiving data over an SMBus, the integrated circuit chip comprising:
    an SMBus interface;
    an interface to a memory storing microcode comprising at least two programs each for handling a bus command protocol, each program comprising at least one instruction;
    an interface to a register configured to identify a starting address of a program in said memory;
    an instruction fetch unit configured to read an instruction at an address in said memory; said address being specified by a program counter (pc);
    a finite-state machine configured to receive and interpret the instructions read by said instruction fetch unit and to manage the data transfer between the SMBus interface, and a register set in compliance with said instructions read from said memory;
    an address register array comprising a plurality of starting addresses of programs stored in said memory, said register comprising an offset for pointing at a specific register in said address register array.

11. The integrated circuit chip of claim 10, wherein said register set complies with the ACPI specification.

12. The integrated circuit chip of claim 11, further comprising a buffer pointer register for pointing at one of a plurality of data registers comprised in register set; said finite-state machine transferring data read from the SMBus interface to the data register at which said buffer pointer register points if said finite-state machine interprets a data reception instruction, said finite-state machine transferring the data read from the data register at which said buffer pointer register points to said SMBus interface if said finite-state machine interprets a data transmission instruction.

13. The integrated circuit chip of claim 12, wherein the finite-state machine causes said buffer pointer register to be incremented each time a data reception instruction or a data transmission instruction is executed.

14. The integrated circuit chip of claim 10, further comprising a loop counter for storing the value of a block counter register SMB_BCNT in said loop counter if the finite-state machine executes an instruction to transmit data from said block counter register to said SMBus interface, said loop counter being decremented each time a data byte is transmitted to said SMBus interface while an instruction to transmit data from said block counter register to said SMBus interface is executed, wherein the instruction to transmit data from said block counter register to said SMBus interface is completed when the value said loop counter reaches zero.

15. The integrated circuit chip of claim 10, further comprising a loop counter and a block count register comprised in said register set both for storing a byte received from said SMBus interface if the finite-state machine executes an instruction to receive data at said block counter register from said SMBus interface, said loop counter being decremented each time a data byte is transmitted to or received from said SMBus interface while an instruction to a receive data at said block counter register is executed, wherein the instruction to receive data at said block counter register from said SMBus interface is completed when the value of said loop counter reaches zero.

16. The integrated circuit chip of claim 10, wherein each instruction comprises one bit indicating as to whether or not an instruction is the last instruction in the program.

17. The integrated circuit chip of claim 10, wherein each instruction comprises one bit indicating as to whether an instruction is to be executed only once or this instruction is to be executed repeatedly until a loop counter becomes zero, wherein said loop counter is decremented each time an instruction is executed repeatedly.

18. A method for controlling an SMBus, the method comprising:
- storing, in a memory, microcode comprising at least two programs each for handling a bus command protocol, each program comprising at least one instruction;
- identifying a starting address of one of the at least two programs stored in the memory;
- fetching instructions of said program one after another and receiving the instructions into a finite-state machine;
- interpreting the instructions;
- transferring data between an SMBus interface and a register set in compliance with the instruction present in said finite-state machine;
- reading a first value of a protocol register specifying an offset in an address register array; and
- reading a second value of a register of said address register array, said register being specified by said offset; said second value constituting said starting address of said program.

19. The method of claim 18, wherein said register set complies with the ACPI specification.

20. The method of claim 19, wherein said transferring step comprising the sub-steps of:
- interpreting a reception instruction;
- reading the value of a buffer pointer register; and
- transferring the data read from said SMBus interface to the data register at which the value stored in said buffer pointer register points.

21. The method of claim 20, wherein said transferring step further comprises incrementing said value of said buffer pointer register.

22. The method of claim 20, wherein said transferring step further comprising decrementing a loop counter and checking as to whether said loop counter has a value of zero.

23. The method of claim 19, wherein said transferring step comprises the sub-steps of:
- interpreting a transmission instruction;
- reading the value of a buffer pointer register; and
- transferring the data read from the data register at which the value stored in said buffer pointer register to said SMBus interface.

24. The method of claim 23, wherein said transferring step further comprises incrementing of said buffer pointer register.

25. The method of claim 23, wherein the transferring step further comprises decrementing of said loop counter.

26. The method of claim 18, wherein said transferring step comprises:
- Interpreting an instruction to transmit data from a block counter register to said SMBus interface;
- storing the value of said block count register in a loop counter; and
- transmitting the value of said block counter register to said SMBus interface.

27. The method of claim 18, wherein said transferring step comprises:
- interpreting an instruction to receive data from said SMBus interface;
- transmitting a byte from said SMBus interface to said block count register; and
- storing the value of the byte received from said SMBus interface to a loop counter register.

28. The method of claim 18, wherein said transferring further comprises:
- determining as to whether a stop bit has a predetermined value; if this is the case:
- writing 80$h$ into a status register of said register set.

29. The method of claim 18, wherein said transferring further comprises:
- determining as to whether a loop bit of an instruction has a predetermined value; if that is the case,
- executing said instruction repeatedly;
- decrementing a loop counter each time said instruction is executed;
- finishing the execution of said loop instruction when the value of the said loop counter becomes zero; and
- fetching the next instruction.

* * * * *